(12) United States Patent
Wang (10) Patent No.: US 11,787,396 B2
(45) Date of Patent: Oct. 17, 2023

(54) AUTOMATIC PARKING ASSISTANCE SYSTEM, IN-VEHICLE DEVICE AND METHOD

(71) Applicant: Volvo Car Corporation, Gothenburg (SE)

(72) Inventor: Wei Wang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 98 days.

(21) Appl. No.: 17/168,271

(22) Filed: Feb. 5, 2021

(65) Prior Publication Data
US 2021/0245735 A1    Aug. 12, 2021

(30) Foreign Application Priority Data

Feb. 7, 2020    (CN) ......................... 202010082521.1

(51) Int. Cl.
*B60W 30/06*    (2006.01)
*B60W 60/00*    (2020.01)
(Continued)

(52) U.S. Cl.
CPC ........ *B60W 30/06* (2013.01); *B60W 30/0956* (2013.01); *B60W 40/04* (2013.01);
(Continued)

(58) Field of Classification Search
CPC ............. B60W 30/06; B60W 60/0027; B60W 30/0956; B60W 40/04; B60W 2554/402; B60W 2556/45
See application file for complete search history.

(56) References Cited

U.S. PATENT DOCUMENTS 10,386,845 B1 *   8/2019   Konrardy ............. G05D 1/0295
2004/0193347 A1 *   9/2004   Harumoto ................ G08G 1/16
                                                                         701/45
(Continued)

FOREIGN PATENT DOCUMENTS

CN        102792349 A    11/2012
CN        110435640 A    11/2019
(Continued)

OTHER PUBLICATIONS

Jun. 17, 2021 Extended European Search Report issued in International Application No. 202010082521.1.
(Continued)

*Primary Examiner* — Jeff A Burke
*Assistant Examiner* — Mohamad O El Sayah
(74) *Attorney, Agent, or Firm* — Clements Bernard Walker; Christopher L. Bernard (57) ABSTRACT

An automatic parking assistance system, an in-vehicle device and an automatic parking assistance method. The in-vehicle device comprises a communication interface for receiving a parking navigation path and traffic information; and a parking controller coupled with the communication interface, the parking controller being configured to: acquire the traffic information and the parking navigation path; control vehicle parking maneuvers based on the parking navigation path; judge whether there is a potential collision object with respect to the vehicle based on the traffic information; in the case that the judgment indicates there is no potential collision object, control the vehicle to travel along the parking navigation path; in the case that the judgment indicates there is a potential collision object, determine a danger level of the potential collision object based on the traffic information and determine safety measures corresponding to the danger level.

14 Claims, 5 Drawing Sheets

(51) Int. Cl.
*B60W 30/095* (2012.01)
*B60W 40/04* (2006.01)

(52) U.S. Cl.
CPC ... *B60W 60/0027* (2020.02); *B60W 2554/402* (2020.02); *B60W 2556/45* (2020.02)

(56) References Cited

U.S. PATENT DOCUMENTS

| | | | | |
|---|---|---|---|---|
| 2015/0370255 | A1* | 12/2015 | Harvey | G05D 1/0287 |
| | | | | 701/24 |
| 2017/0251092 | A1* | 8/2017 | Elie | H04W 12/06 |
| 2018/0093663 | A1* | 4/2018 | Kim | G08G 1/166 |
| 2019/0066503 | A1* | 2/2019 | Li | G08G 5/0013 |
| 2019/0118801 | A1* | 4/2019 | Noh | B60W 30/06 |
| 2020/0001862 | A1 | 1/2020 | Luo et al. | |
| 2020/0164896 | A1* | 5/2020 | Sakurada | B60W 50/14 |
| 2020/0180607 | A1* | 6/2020 | Choi | G08G 1/143 |
| 2020/0207336 | A1* | 7/2020 | Oh | B60W 50/14 |
| 2021/0101586 | A1* | 4/2021 | Woo | B62D 15/0285 |
| 2021/0323537 | A1* | 10/2021 | Fan | G08G 1/096844 |
| 2022/0319327 | A1* | 10/2022 | Nakamura | G08G 1/166 |

FOREIGN PATENT DOCUMENTS

| | | | |
|---|---|---|---|
| EP | 3101640 | A1 | 12/2016 |
| WO | 2019066477 | A1 | 4/2019 |

OTHER PUBLICATIONS

Apr. 29, 2023 Office Action issued in corresponding CN Application No. 202010082521.1.

\* cited by examiner

AUTOMATIC PARKING ASSISTANCE SYSTEM, IN-VEHICLE DEVICE AND METHOD

CROSS-REFERENCE TO RELATED APPLICATION

The disclosure claims the benefit of priority of co-pending Chinese Patent Application No. CN 202010082521.1, filed on Feb. 7, 2020, and entitled "AUTOMATIC PARKING ASSISTANCE SYSTEM, IN-VEHICLE DEVICE AND METHOD," the contents of which are incorporated in full by reference herein.

TECHNICAL FIELD

The disclosure relates generally to the technical field of automatic parking assistance. Specifically, it relates to an in-vehicle device for automatic parking assistance, to an automatic parking assistance system comprising the in-vehicle device, and to an automatic parking assistance method.

BACKGROUND

Autonomous driving technology for vehicles is a hot research topic today. Among many functions of vehicle autonomous driving, the function of automatic parking assistance draws much attention because it does great help to park a vehicle.

The existing solutions for automatic parking assistance mostly take a vehicle as an intelligent agent, that is, a vehicle is constructed as an intelligent mobile agent. To do that, sensors with strong sensing capability and a controller with strong computing capability are needed.

The existing solutions are costly since the sensors and controller with powerful functions are expensive. Moreover, in order to ensure safety, the existing solutions relying on the intelligent vehicle as an individual intelligent agent, put forward higher requirements on the reliability of each stage in a process of automatic parking assistance, which results in a longer development cycle.

Therefore, it is desired to have a technical solution to solve the above problems.

SUMMARY

In view of the above problems in the prior art, the disclosure aims to provide an improved technical solution, which can reduce costs and increase efficiency, for automatic parking assistance.

Therefore, according to one aspect of the disclosure, an in-vehicle device for automatic parking assistance is provided, comprising a communication interface wirelessly communicated with an external computing device and an external sensing device that is disposed outside a vehicle, wherein the communication interface is configured to receive a parking navigation path from the external computing device and receive traffic information representing traffic conditions around the vehicle from the external sensing device and/or in-vehicle sensors. The parking navigation path is a path between a parking position and a drop-off position; and there is a parking controller coupled with the communication interface, which is configured to acquire the traffic information and the parking navigation path, control vehicle parking maneuvers based on the parking navigation path, judge whether there is a potential collision object to the vehicle based on the traffic information. If the judgment indicates there is no potential collision object, the parking controller controls the vehicle to travel along the parking navigation path. If the judgment indicates there is a potential collision object, the parking controller determines a danger level of the potential collision object based on the traffic information and determines safety measures corresponding to the danger level.

According to an embodiment, the parking controller is further configured to, in the case that the starting point of the parking navigation path is the drop-off position and the ending point of the parking navigation path is the parking position, enable a scanning function for scanning the parking space to which the vehicle will be guided when the vehicle reaches a position within a predetermined distance from the parking position.

According to an embodiment, the length of the predetermined distance is between 1-2 times the width of the parking space along the direction in which the vehicle is travelling and approaching the parking position.

According to an embodiment, the parking position is a position along a central line of the parking navigation path at a half of width of the parking space.

According to an embodiment, in the case that the scanning function is enabled and the parking space is detected to be unavailable based on the scanning, the parking controller generates a request for requesting a new parking space and sends the request to the external computing device through the communication interface.

According to an embodiment, the safety measures include at least one of:
enabling the vehicle to avoid the potential collision object, optionally, to avoid the potential collision object by means of at least one of decelerating and going around the potential collision object; braking and waiting; and changing lanes;
warning the potential collision object to avoid the vehicle, optionally, the warning measure includes acoustic outputs and/or optical outputs to the potential collision object from the vehicle;
sending a request to a third party for moving the potential collision object; and
sending a request to the external computing device for requesting a new parking navigation path.

According to an embodiment, the parking controller determines the danger level by means of: extracting object features of the potential collision object from the traffic information; and determining the danger level corresponding to the object features.

According to an embodiment, determining the danger level includes searching the danger level corresponding to the object features in a correlation table (e.g., a predetermined correspondence relation table). The correlation table includes correspondence relationships between each object feature and a corresponding danger level.

According to an embodiment, the object features include object types or object sizes or both, the object types including a movable type and an immovable type; an absolute position of the potential collision object and/or a relative distance between the potential collision object and the vehicle; and a relative position of the potential collision object relative to the current travelling lane.

According to an embodiment, the movable potential collision object includes at least one of vehicle, person and animal, and the immovable potential collision object includes immovable obstacles.

According to an embodiment, the object features further includes a motion trajectory of a movable object; and the parking controller is further configured to predict a motion trend of the movable object based on the motion trajectory and to determine the danger level based on the motion trend.

According to an embodiment, the parking controller is configured to predict the motion trend by means of a machine learning model, wherein the motion trajectory of the movable object during a previous time period is used as a model input, and the model outputs a predicted trajectory of the movable object during a next time period as the motion trend; or the parking controller is configured to determine the motion trend of the movable object based on an extension line of the motion trajectory and a moving speed of the movable object.

According to an embodiment, the parking navigation path is calculated by the external computing device based on the following information and is wirelessly transmitted to the communication interface:
(1) map data of a parking area, wherein the parking area can be in a parking lot;
(2) status information of parking spaces in the parking area;
(3) the current position of the vehicle; and
(4) traffic regulations.

According to an embodiment, wherein the external computing device comprises a cloud server and/or a computing device arranged in a parking area; and the external sensing device comprises roadside sensors arranged in a parking area for sensing traffic conditions of the parking area. In an example, the roadside sensors comprise one or more of a camera, a lidar, and a radar.

According to an embodiment, before receiving the parking navigation path, the in-vehicle device receives reminder information through the communication interface in the case that the current state of the vehicle is a violation state; and the parking controller is configured to adjust the current state of the vehicle to a compliance state in response to receiving the reminder information.

According to an embodiment, the parking controller is arranged in an electronic control unit (ECU) of the vehicle, or is arranged to be independent of and communicatively connected with the electronic control unit.

According to another aspect of the disclosure, an automatic parking assistance system comprises: a remote server wirelessly communicated to a vehicle, the remote server being configured to calculate a parking navigation path based on previously stored information, the information including: (1) map data of a parking area; (2) status information of parking spaces in the parking area; (3) the current position of the vehicle; and (4) traffic regulations wherein the parking navigation path is a path between a parking position and a drop-off position; a roadside facility wirelessly communicated with the vehicle and the remote server, including roadside sensors for sensing traffic information representing traffic conditions around the vehicle; and an in-vehicle device, optionally, the in-vehicle device is implemented by means of the in-vehicle device as described above, which can wirelessly communicate with the remote server and the roadside facility and communicatively connect with in-vehicle sensors, and is also configured to perform automatic parking control based on information received from the remote server and the roadside facility and the information received from the in-vehicle sensors.

According to yet another aspect of the disclosure, an automatic parking assistance method is provided, optionally executed by the in-vehicle device as described above and/or the automatic parking assistance system as described above, the method comprises: receiving a parking navigation path and traffic information, wherein the parking navigation path is a path between a parking position and a drop-off position and the traffic information represents traffic conditions around the vehicle; controlling vehicle parking maneuvers based on the parking navigation path; judging whether there is a potential collision object with respect to the vehicle based on the traffic information; in the case that the judgment indicates there is no potential collision object, controlling the vehicle to travel along the parking navigation path; in the case that the judgment indicates there is a potential collision object, determining a danger level of the potential collision object based on the traffic information and determining safety measures corresponding to the danger level.

According to embodiments of the disclosure, the automatic parking assistance that normally would require higher sensing and computing capabilities can be realized without the need of powerful sensors and controllers disposed in the vehicle, because the sensing and computing operations for obtaining the parking navigation path are completed by a device outside the vehicle. Thus, the vehicle can directly obtain the parking navigation path in the case of "no sensing operation" and "no calculating operation" for the parking navigation path on the vehicle side.

Moreover, according to embodiments of the disclosure, if a potential collision object appears in the process of the vehicle travelling on the parking navigation path, corresponding safety measures can be determined according to a danger level of the object, rather than simply taking a braking measure or issuing sound and light warnings. Therefore, embodiments of the disclosure can provide a more intelligent and responsive control strategy in the process of automatic parking.

Moreover, according to embodiments of the disclosure, the controlling strategy includes enabling the scanning function for scanning the parking space when the vehicle reaches a position within an appropriate distance from the parking position, which can save computing power in the vehicle and avoid misoperations caused by scanning a wrong parking space.

DETAILED DESCRIPTION

The disclosure relates to technical solutions of automatic parking assistance. In the disclosure, "automatic parking assistance" comprises assisting a vehicle to travel from a drop-off position to a parking position and from a parking position to a drop-off position.

In the disclosure, "parking navigation path" refers to a path between a parking position and a drop-off position. The path may be implemented taking the parking position as a starting position and the drop-off position as an ending point, or the drop-off position as a starting position and the parking position as an ending point.

In the disclosure, "parking position" refers to a position within or proximate to a parking space (such as a parking spot in a parking lot). For example, a parking position can be the position where the vehicle turns from its current travel lane and enters into the parking space. In one embodiment, the vehicle may start turning at half of the width of the parking space along the central line of the current travel lane, which is the parking position in this case.

In the disclosure, "drop-off position" may be a position at which a driver can park a vehicle for automatically parking and then retrieve the vehicle from that position. For example, on a parking lot, a vehicle is controlled to travel to the parking position from the drop-off position and is pulled into a parking space from the parking position.

In the disclosure, "parking area" may be understood as an area comprising one or more parking spaces, for example, a parking lot or garage which may include multistory parking lots.

Embodiments of the disclosure will be described now.

Figure 1:
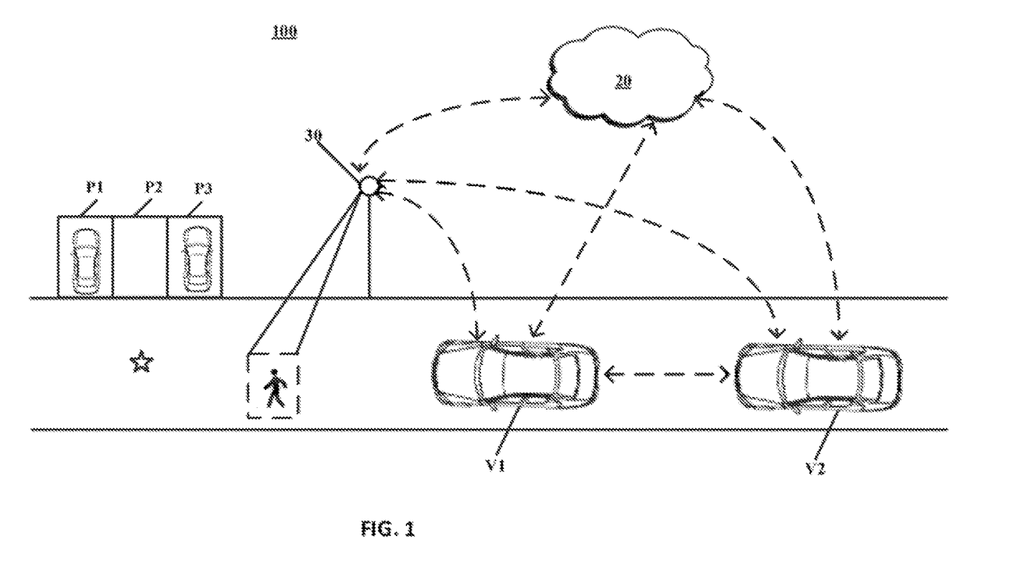
FIG. 1 illustrates an exemplary operating environment in which embodiments of the disclosure can be implemented.
Figure 2:
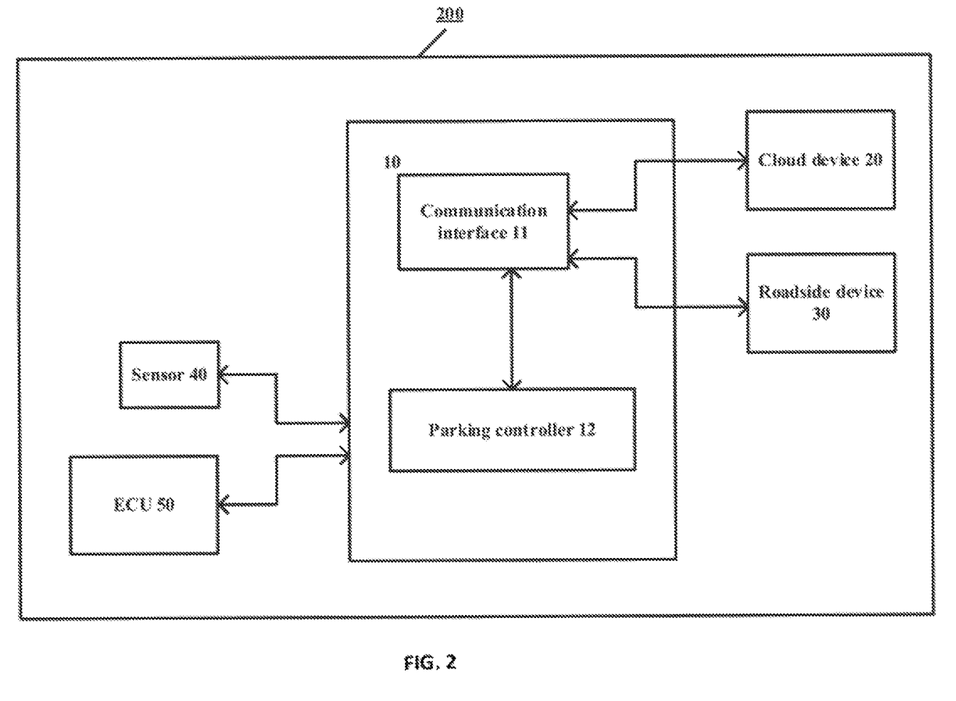
FIG. 2 is a schematic block diagram of an automatic parking assistance system according to an embodiment of the disclosure, the system including an in-vehicle device for automatic parking assistance according to embodiments of the disclosure.

FIG. 1 illustrates an exemplary operating environment 100 in which some embodiments of the disclosure can be implemented. FIG. 2 schematically shows a parking assistance system 200 according to an embodiment of the disclosure, which includes an in-vehicle device 10.

Referring to FIGS. 1 and 2, the operating environment 100 can be a synergetic ecosystem (may also be called an intelligent parking system) for automatic parking, but the disclosure is not limited to the specific framework. In some embodiments, the operating environment 100 may include multiple vehicles V1 and V2 that can communicate with one another, a remote server (e.g., a cloud device) 20 and a roadside facility (e.g., a roadside device) 30. In the operating environment 100, the in-vehicle device 10 is mounted to the vehicle V1, and any two of the in-vehicle device 10, the remote server 20 and the roadside facility 30 can communicate with each other. The operating environment 100 also includes a parking area comprising multiple parking spots P1-P3 and obstacles (which may be potential collision objects for the vehicle V1). One example of the obstacles is a person, who is walking on the current travel lane of the vehicle V1, represented in the FIG. 1.

The parking assistantance system 200 mainly comprises the in-vehicle device 10 installed in the vehicle V1, the remote server (e.g., a cloud device) 20 outside the vehicle V1 and the roadside device (e.g., a roadside device) 30. Hereinafter components of the parking assistant system 200 will be now detailed.

The remote server 20 has data analyzing and processing capability. The remote server can be implemented as a single server or as server arrays or clusters. In some embodiments, the remote server may be deployed on a distributed computing environment and may be implemented by means of cloud computing technology. For example, the remote server may be implemented as a cloud server.

The roadside facility 30 may comprise roadside sensors, a computing device and a communication unit. The roadside sensors are used for sensing (capturing) traffic condition in a parking area, such as obstacle information around the vehicle. The roadside sensors may comprise a camera and/or radar (e.g., lidar or millimeter wave radar). The computing device may communicate with the sensors in a wired or wireless manner or a manner of a combined wired and wireless connection. The computing device may be used for analyzing and processing traffic information representing traffic conditions and the traffic information are sensed by the sensors. The computing device is also arranged to integrate with the sensors. The communication unit is able to communicate with both the roadside sensors and the computing device. The communication unit may wirelessly transmit (for example, unicast, broadcast) the information sensed by the roadside sensors or the computation result computed by the computing device to a vehicle in the parking area.

In an embodiment of taking a parking lot as an application scenario for automatic parking, the roadside sensors are disposed at several places in the parking lot to realize no-blind-area coverage of the parking lot. The roadside sensors may transmit sensed traffic information to vehicles in the parking lot, so that parking assist devices (in-vehicle devices) in the vehicles perform identifying and processing to assist the automatic parking. The roadside sensors may also transmit the sensed traffic information to the computing device. The computing device may analyze and process the traffic information and then transmit analyzing and processing results to vehicles in the parking lot to assist the automatic parking.

The in-vehicle device 10 can be an in-vehicle terminal. In one embodiment, the in-vehicle device 10 mainly comprises the communication interface 11 and the parking controller 12 communicated with the communication interface 11. The in-vehicle device 10 performs information interaction with the remote server 20 and the roadside facility 30 in a wireless communication manner via the communication interface 11. For example, the in-vehicle device 10 receives information (e.g., instructions and/or data) from the remote server 20 and/or the roadside facility 30 via the communication interface 11, and transmits the information to the parking controller 12 so that the parking controller 12 controls a parking process based on the information. The parking controller 12 may be implemented by means of software or hardware or by a combination of software and hardware.

The in-vehicle device 10 is configured to communicate with one or more components of the vehicle V1. The one or more components comprise an in-vehicle sensor 40 and a control unit 50 in the vehicle V1. The in-vehicle sensor 40 may comprise an ultrasonic sensor for detecting distance information. The ultrasonic sensor may comprise multiple ultrasonic sensors (e.g., an ultrasonic radar) mounted on the perimeter of the vehicle. The sensor in the vehicle V1 may also comprise an image capturing apparatus. The image capturing device may comprise multiple cameras mounted on the vehicle V1. The image capturing device is used to capture pictures and/or videos including traffic conditions around the vehicle V1. The control unit 50 in the vehicle V1, for example, is an electronic control unit (ECU).

It is noted that the parking controller 12 in the in-vehicle device 10 may be disposed in the ECU, i.e., the control strategy of automatic parking assistance according to the disclosure is realized through the ECU. The parking controller 12 may also be constructed as a controller separated from the ECU and communicated with the ECU.

The in-vehicle device 10 and the remote server 20 may be communicatively coupled via a network which can be implemented as a wireless network, and the wireless network may be based on any wireless communication technologies and/or standards. For example, the network may comprise telecommunication network provided by telecom operators with any standards. The network may be implemented as a single network, and may also be implemented to include multiple networks. The network may also comprise Internet of Thing (IoT). Network may also be implemented as a self-organizing wireless network.

The in-vehicle device 10 may communicate peer-to-peer with the roadside facility 30. For example, communications between the in-vehicle device 10 and the roadside facility 30 may be performed by means of V2X network (DSRC/C-V2X), WLAN, infrared (IR) network, Bluetooth network, near field communication (NFC) network or ZigBee network.

Additionally, the vehicle V1, as one node in the operating environment 100, is able to communicate with other nodes in the operating environment 100. Other nodes may comprise the other vehicle V2, mobile terminals (not shown), etc. For example, the vehicle V1 may interact with the other vehicle V2 in the parking area, i.e., vehicles in the parking area may perform V2V communications with each other.

Figure 3:
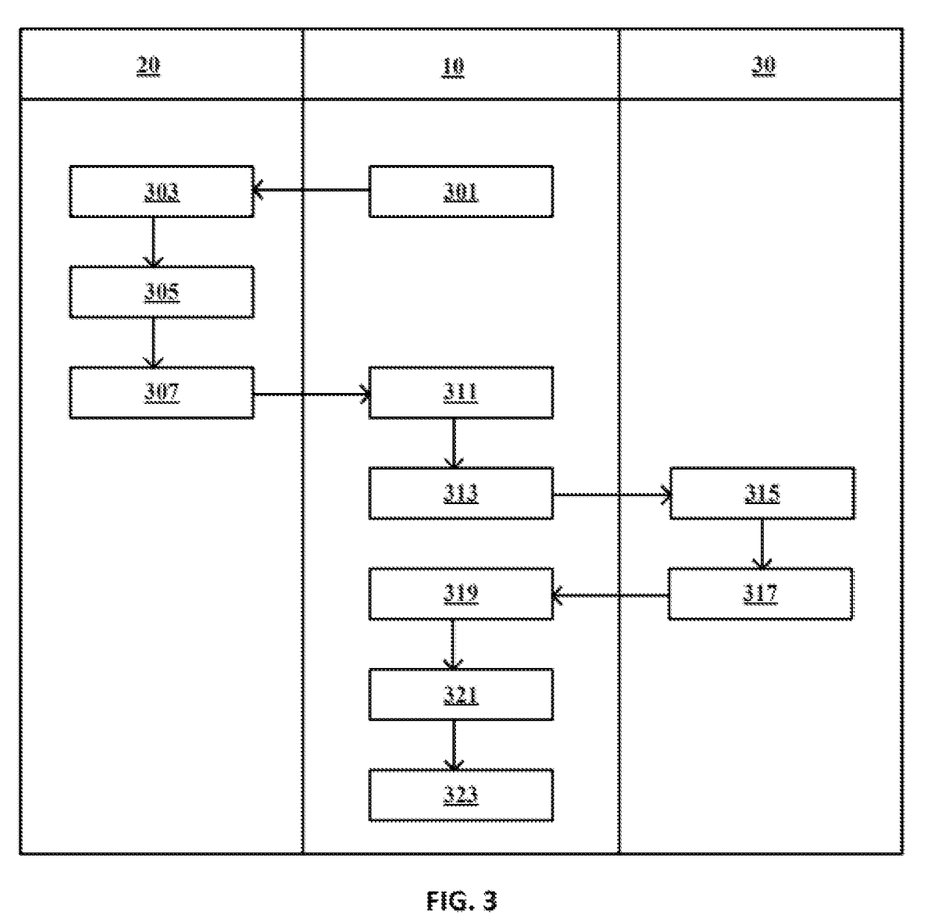
FIG. 3 is a swim-lane diagram illustrating an exemplary communication between an in-vehicle device and external devices including a remote server and roadside facility outside the vehicle according to an embodiment of the disclosure.

FIG. 3 is a swim-lane diagram illustrating an exemplary communication between the in-vehicle device 10 in vehicle V1 and the external devices including the remote server 20 and the roadside facility 30 according to an embodiment of the disclosure. The operation principle and process of the in-vehicle device 10 are described below with reference to FIG. 3.

First, when the vehicle V1 (i.e., the host vehicle) is required to park automatically, an automatic parking request may be transmitted to the remote server 20 by the in-vehicle device 10 or a remote device communicated with the in-vehicle device 10 to request a parking navigation path for assisting the automatic parking (block 301). The parking request includes vehicle data related to the host vehicle and parking space requirements. For example, the vehicle data includes the current position of the host vehicle, the vehicle size and the direction the vehicle is going. For example, the parking space requirements include requirements for the size of parking space, so that the selected parking space can fit the host vehicle.

It is noted that the automatic parking request may be transmitted from the inside or outside of the vehicle V1. For example, the in-vehicle device 10 may further include a button for transmitting the automatic parking request. A driver of the vehicle V1 may press the button inside the vehicle to trigger the transmission of the request to the remote server 20. A driver, who is outside the vehicle V1, may also operate a mobile terminal (e.g., a smart phone) communicated with the vehicle V1 to trigger the transmission of the request to the remote server 20.

After receiving the automatic parking request (block 303), the remote server 20 may determine whether the current state of the vehicle V1 is a compliance state or a violation state. Here, a "compliance state" refers to a state when the vehicle V1 meets all the requirements, including vehicle door being closed, vehicle speed being zero, no crossing a lane, and the direction of travel conforming to the direction of the parking path along which the vehicle will be guided for parking. A "violation state" refers to a state when the vehicle V1 does not meet all the requirements, including for example, vehicle door being open, crossing a lane, and the direction of travel not conforming to the direction of the parking path along which the vehicle will be guided for parking.

In the case that the remote server 20 determines the current state of the vehicle V1 is a violation state, the remote server 20 may send an alert to the vehicle V1 so that a driver of the vehicle V1 or the parking controller 12 may control the vehicle V1 to rectify its current state into a compliance state. Then an automatic parking request is sent to the remote server 20 again.

In the case that the remote server 20 determines the current state of the vehicle V1 is a compliance state, the remote server 20 calculates the parking navigation path based on previously stored information (block 305). The parking navigation path is a path between a parking position and a drop-off position. The previously stored information includes: (1) map data of the parking area, e.g., a high precision map (HP Map); (2) status of parking spots in the parking area, for example, which parking spots are already occupied or still empty, and sizes and locations of the parking spots; (3) the current position of the vehicle V1; (4) traffic laws and regulations, for example, the vehicle V1 should travel along the right-hand side or the left-hand side according to the current traffic regulations, and route regulations of the current parking area (e.g., a parking lot).

It is noted that when the vehicle V1 exits a parking spot, the starting point of the parking navigation path is the parking position and the ending point is the drop-off position.

It is noted that, when the vehicle V1 enters a parking spot, the starting point of the parking navigation path is the drop-off position and the ending point is the parking position. In this case, the remote server 20 is required to select an available parking spot for the vehicle V1 in the parking area. Various strategies may be taken to select the parking spot. For example, the farthest available parking spot is selected for the first-in vehicle, or an available parking spot is selected based on a shortest path during parking, or an available parking spot is selected based on being closest to the vehicle door, etc.

Next, the remote server 20 transmits the calculated parking navigation path to the in-vehicle device 10 (block 307). The in-vehicle device 10 receives the parking navigation path via the communication interface 11 (block 311). The parking controller 12 controls the vehicle V1 to travel along the parking navigation path (block 313).

During the process of the vehicle V1 travelling along the parking navigation path, an external sensing device outside the vehicle V1, for example, a roadside sensor (for example, a camera and/or a radar) arranged in the parking area, detects traffic conditions around the vehicle (block 315), and sends the information representing the traffic conditions to the in-vehicle device 10 (block 317). The in-vehicle device 10 receives the information via the communication interface 11 (block 319).

In an embodiment, in block 319, the in-vehicle device 10 may also receive information representing traffic conditions around the vehicle detected by the in-vehicle sensor 40. In this embodiment, the information obtained by the roadside sensor is cross checked with the information obtained by the in-vehicle sensor (for example, multisensor information fusion is used), so that a cross-checked judgment can be made based on the information of the two sensors and thus the complementarity and redundancy is realized. This solution is advantageous, because correlating and verifying information from the multiple sensors can overcome the problems such as camera distortion caused by rain, detection obstacle caused by surface water reflection, the limited sensing range of a single sensor. The accuracy and reliability of potential collision object detection is thus improved.

It is noted that the detection of potential collision objects may be based only on the information sensed by the roadside sensors, or based only on the information sensed by the in-vehicle sensors, and may also be based on the combination of the information sensed by both. In other words, even if one of the roadside sensor detection and the in-vehicle sensor detection fails, the other can remedy the failure.

Next, the in-vehicle device 10 determines whether there is a potential collision object with respect to the vehicle V1 based on the obtained traffic information (block 321). If it is determined that there is no potential collision object, the vehicle V1 is controlled to continue to travel along the parking navigation path. If it is determined that there is a potential collision object, the object features of the potential collision object are identified from the traffic information, and a danger level of the potential collision object is determined based on the object features, such that safety measures corresponding to the danger level can be determined for the vehicle V1 (block 323).

In some embodiments, the object features may include the following features:

(1) Types and sizes of the potential collision object. The types include a movable type and an immovable type. Potential collision objects of a movable type may include at least one of a person, a vehicle or an animal. Potential collision objects of an immovable type may include immovable obstacles such as static obstacles (e.g., an article box).

(2) An absolute position (e.g., GPS coordinates) of the potential collision object and/or a relative distance of the potential collision object relative to the vehicle V1. The relative distance between the potential collision object and the vehicle V1 may be calculated based on the absolute position of the potential collision object and the current position of the vehicle V1 at an in-vehicle terminal or a roadside device.

(3) A relative positional relationship between the potential collision object and the current travelling lane of the vehicle. For example, the potential collision object is in or outside the travelling lane.

(4) In the case of the potential collision object being of a movable type, the object features may also include a motion trajectory of the movable object such that the motion trend and possible position of the movable object in a later time period can be predicted based on the motion trajectory at an in-vehicle device or a roadside computing device.

The parking controller 12 may include a control logic through which a danger level of the potential collision object is determined based on the object features. Moreover, corresponding safety measures are taken according to the danger level.

It is noted that the danger level indicates the probability of collision between the vehicle V1 (the host vehicle) and the potential collision object. For example, if the danger level is high, it means the probability of collision is high, and high-level safety measures should be taken. If the danger level is low, it means the probability of collision is low, and low-level safety measures should be taken.

In some embodiments, the parking controller 12 may look up the danger level corresponding to the object features from a correlation table. The correlation table contains the correlation between each object feature and a corresponding danger level. For example, the danger level is divided into n levels, i.e. danger levels 1-n, wherein n is a suitable natural number. For example, the danger level is divided into danger levels 1-5. The higher the danger represented by the object features is, the higher the corresponding danger level will be. Thus, the dangerous situations of obstacles can be quantified, and the intelligence and safety level of vehicle parking process can be improved.

The following describes the control logic with some examples.

In the case where the judgment of the potential collision object indicates the potential collision object is of an immovable type and is located outside the travelling lane based on the identified object features, the danger level of the potential collision object is determined to be the lowest level, for example, danger level 1, and a corresponding safety measure of the lowest level is selected, such as deceleration when the vehicle passes a stationary obstacle.

In the case where the judgment of the potential collision object indicates the potential collision object is of a movable type and is located within the travelling lane based on the identified object features, the danger level of the potential collision object is determined to be the highest level, for example, danger level 5, and a corresponding safety measure of the highest level is selected, such as braking the vehicle to wait for the object to pass and then to continue to travel.

In the case where the judgment indicates the potential collision object is of a movable type and is located outside the travelling lane based on the identified object features, the danger level of the potential collision object is determined as a medium high level, for example, danger level 3. In this case, an acoustic input (for example, whistle) or an optical output (for example, flashing light) may be provided to the object to warn the object to proactively avoid the vehicle. In this case, a motion trend of the object in the next time period can be predicted based on the obtained motion trajectory of the object so as to determine a corresponding danger level according to the motion trend. For example, if the motion trend is to move further away from the host vehicle, the danger level would be determined as low and the host vehicle may decelerate; if the motion trend is to move closer to the host vehicle, the danger level would be determine as high and the host vehicle may brake and wait for the object to pass.

In an embodiment, the motion trend of the movable object in the next time period may be determined based on an extension line of the motion trajectory of the movable object (for example, the extension line is plotted according to the last two preceding positions of the movable object) and a moving speed of the movable object so as to determine a possible position of the object in the next few seconds.

In another embodiment, the motion trend of the movable object may be predicted using a machine learning model. For example, the motion trajectory of the object in a preceding time period (for example, the past 5 seconds) is taken as model input, and the model outputs the predicted trajectory of the object in the next time period (for example, the next 5 seconds) to represent the motion trend of the object. It is advantageous to use a machine learning model to predict the trend of motion trajectory, because the machine learning model can learn and determine the time-dependent relationship between data so as to efficiently and accurately analyze the motion trend of the object for the next time period, which in turn helps accurately determine the needed safety measures. By using the machine learning model, excessive safety measures can be avoided when the danger level is overestimated and collision can also be avoided when the danger level is underestimated.

It is noted that exemplary danger levels of potential collision objects and corresponding safety measures are provided above, and the disclosure is not limited to those examples. In general, the safety measures taken with respect to potential collision objects may include the following aspects:

(1) The vehicle avoids potential collision objects.
(2) Potential collision objects are warned to avoid the vehicle.

(3) The vehicle brakes and requests a new parking navigation path.

(4) A request is sent to a third party to remove obstacles. For example, a request is sent to a device carried by an administrator in the parking area, such that the administrator is notified to remove the obstacle.

In another embodiment, roadside sensors of the roadside facility 30 transmit the sensed traffic information to a computing device of the roadside facility. The computing device identifies and analyzes the traffic information and then sends the results to the in-vehicle device 10 through a communication unit of the roadside facility 30.

It is noted that the vehicle V1 may also send an automatic parking request to the roadside facility 30. The parking navigation path is calculated by a computing device of the roadside facility 30 and then sent to the vehicle via a communication unit of the roadside facility 30. In this case, the roadside facility stores the information for calculating the parking navigation path as described above, and computing device of the roadside facility 30 calculates the parking navigation path based on the information. The parking navigation path may also be calculated by the remote server or the roadside computing device and then sent to the vehicle V1 through the communication interface 11. The remote server and the roadside computing device are located outside the vehicle V1, which can be collectively referred to as external computing devices. Therefore, the in-vehicle device 10 may receive the parking navigation path from the external computing devices via the communication interface 11.

Figure 4:
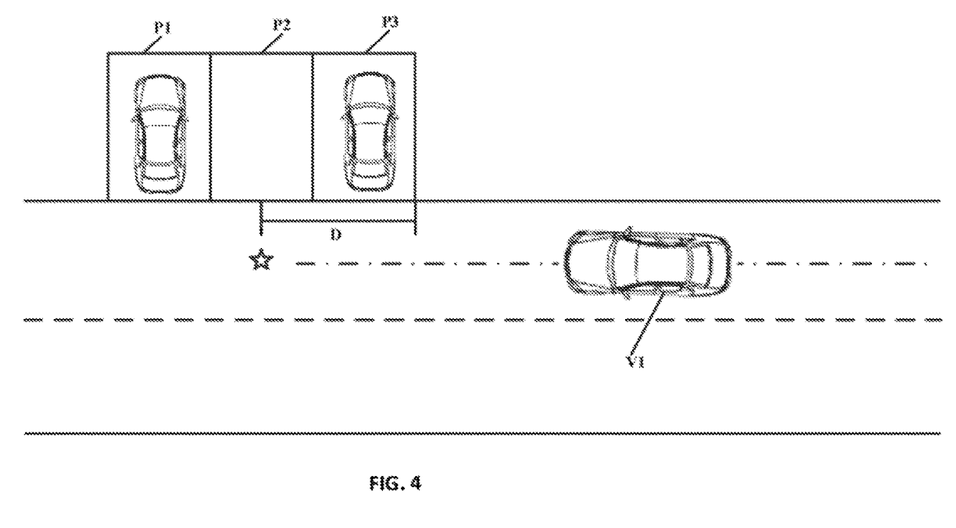
FIG. 4 is a schematic diagram showing the working principle of the in-vehicle device according to the disclosure.

In addition, according to embodiments of the disclosure, the parking controller 12 may also include a control strategy for enabling a scanning function for scanning parking spaces in advance of entering the parking position. Referring to FIG. 4, a predetermined distance D is stored in the parking controller 12 in advance. In the case that a starting point of the parking navigation path is the drop-off position and an ending point of the parking navigation path is the parking position, the parking controller 12 controls the vehicle V1 to enable the scanning function to scan the parking space to which the vehicle will be guided when the vehicle is within a predetermined distance D from the parking position.

In some embodiments, the parking position (refer to the icon"☆" in FIG. 1 and FIG. 4) is in the middle line of the current driving lane and corresponds to a midpoint of the width of the parking space. The length of the predetermined distance is between 1-2 times the width of the parking space along the direction in which the vehicle is travelling when approaching the parking position.

It is advantageous to use the control strategy during an automatic parking process, because by setting a reasonable predetermined distance, the power consumption of a premature scan by in-vehicle sensors is saved. More importantly, the misoperation caused by scanning an unselected parking space during parking will be avoided.

Even when the vehicle V1 pre-scanned the parking space to be available, when the vehicle V1 arrives at the parking position, the parking space may actually be unavailable due to different reasons, including the size of the obstacle in the parking space being too small (for example, a storage box) to be detected through pre-scanning, or part of the parking space is occupied by vehicles parked next to that parking space. In that case, the vehicle V1 may send a request to the remote server 20 for a new parking space. For example, the parking controller 12 generates a request for a new parking space and sends the request to the remote server 20 via the communication interface 11.

Moreover, in the case where the parking space is unavailable, the vehicle V1 may also send (report) the situation to a parking space management system (for example, a parking lot management system), so that the parking space management system updates the status information of the parking space as part of an intelligent parking space management system.

Figure 5:
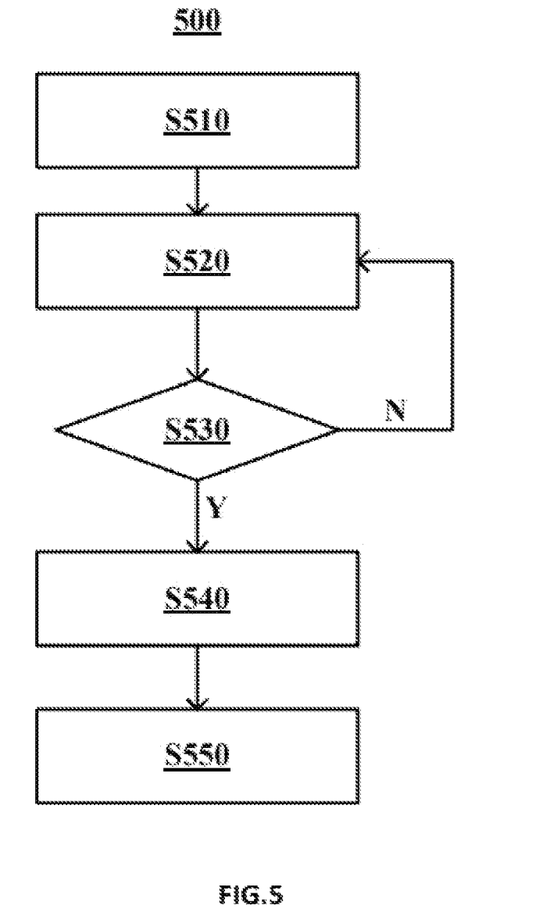
FIG. 5 is a flow chart of an automatic parking assistance method according to an embodiment of the disclosure.

FIG. 5 shows an automatic parking assistance method 500 according to an embodiment of the disclosure. Notably, the method 500 may be performed by the in-vehicle device 10 or by the automatic parking assistance system 200. The features, which are described above with reference to the in-vehicle device 10 and the automatic parking assistance system 200, are also applicable to the automatic parking assistance method 500 and would not be repeated.

In step S510, the in-vehicle device 10 receives a parking navigation path and traffic information through the communication interface 11. The parking navigation path is a path between the parking position and the drop-off position. The traffic information represents the traffic situations around the vehicle.

In step S520, the parking controller 12 controls the vehicle V1 to travel along the parking navigation path.

In step S530, the parking controller 12 determines whether there is a potential collision object with respect to the vehicle V1 based on the traffic information.

If it is determined there is no potential collision object in step S530, the method 500 returns to step S520, and the parking controller 12 continues to control the vehicle V1 to travel along the parking navigation path.

If it is determined there is a potential collision object in step S530, the method 500 proceeds to step S540. In step S540, the parking controller 12 determines the danger level of a potential collision object.

In step S550, the parking controller determines safety measures corresponding to the danger level.

According to embodiments of the disclosure, low-cost hardware (including sensors and controllers for driving assistance) are used and appropriate control strategies are designed on the vehicle side and the automatic parking assistance can be achieved by the cooperation between the in-vehicle device, the cloud device and the road device. It is advantageous that advanced driving assistance functions such as automatic parking can be achieved by using low-cost vehicle-side hardware.

Moreover, according to embodiments of the disclosure, if a potential collision object appears when the vehicle is travelling along the parking navigation path, the danger level of the potential collision object can be determined according to the object features, and appropriate safety measures corresponding to the danger level can be determined and selected, rather than taking agnostic measures irrespective to the danger level of the potential collision object. Therefore, this disclosure can provide a more intelligent and reasonable control strategy for the automatic parking.

Moreover, according to embodiments of the disclosure, the scanning function for scanning the parking space is enabled when the vehicle is within a predetermined distance from the parking space, which saves power consumption of the vehicle and avoids scanning a wrong parking space.

It is noted that the articles "a" and "an" are intended to include one or more items, and may be used interchangeably with "one or more." Also, as used herein, the terms "has," "have," "having," and/or the like are intended to be openended terms. Further, the phrase "based on" is intended to mean "based, at least in part, on" unless explicitly stated otherwise.

While certain embodiments have been described, these embodiments have been presented by way of example only, and are not intended to limit the scope of the invention. The attached claims and their equivalents are intended to cover all the modifications, substitutions and changes as would fall within the scope and spirit of the invention.

The invention claimed is:

1. An in-vehicle device for automatic parking assistance, comprising:
   a communication interface wirelessly communicated with an external computing device and an external sensing device that are disposed outside a vehicle, wherein the vehicle comprises one or more in-vehicle sensors, and wherein the communication interface receiving a parking navigation path from the external computing device and receiving traffic information representing traffic conditions around the vehicle from the external sensing device or in-vehicle sensors or both, the parking navigation path being a path between a parking position and a drop-off position; and
   a parking controller coupled with the communication interface, the parking controller being configured to:
   acquire the traffic information and the parking navigation path;
   control vehicle parking maneuvers based on the parking navigation path;
   determine whether there is a potential collision object based on the traffic information; and
   perform the following operation based on said determination:
   when it is determined that there is no potential collision object, controlling the vehicle to travel along the parking navigation path; when it is determined that there is a potential collision object, determining a danger level of the potential collision object based on the traffic information and determine safety measures corresponding to the danger level, the danger level indicating a probability of collision between the vehicle and the potential collision object,
   wherein determining the danger level of the potential collision object comprises:
   extracting object features of the potential collision object from the traffic information; and
   determining the danger level corresponding to the object features by searching the danger level corresponding to the object features in a correlation table including a correlation between each object feature and a corresponding danger level;
   wherein, before receiving the parking navigation path, the in-vehicle device receives an alert through the communication interface, when the vehicle is in a violation state, the violation state including at least one of at least one vehicle door being open, the vehicle crossing a lane, and the direction of the front of the vehicle not matching the direction of the parking navigation path; and
   wherein the parking controller is configured to adjust the vehicle to a compliance state in response to receiving the alert, the compliance state including all of the vehicle door being closed, the vehicle speed being zero, the vehicle not crossing a lane, and the direction of the front of the vehicle matching the direction of the parking path.

2. The in-vehicle device according to claim 1, wherein the parking position is a position within or approximate to a parking space, the parking controller is further configured to, in the case that a starting point of the parking navigation path is the drop-off position and an ending point of the parking navigation path is the parking position, enable a scanning function to scan the parking space when the vehicle is at a predetermined distance from the parking space.

3. The in-vehicle device according to claim 2, wherein the length of the predetermined distance is between 1-2 times the width of the parking space along the direction in which the vehicle is travelling and approaching the parking position.

4. The in-vehicle device according to claim 2, wherein the parking position is a position along a central line of the parking navigation path at a half of width of the parking space.

5. The in-vehicle device according to claim 2, wherein when the scanning function is enabled and the parking space is detected to be unavailable based on the scanning, the parking controller is configured to generate a request for a new parking space and send the request to the external computing device through the communication interface.

6. The in-vehicle device according to claim 1, wherein the safety measures include at least one of:
   controlling the vehicle to avoid the potential collision object, wherein the controlling measures includes at least one of decelerating, going around the potential collision object, braking, stopping, waiting for the potential collision object to pass, and changing lanes;
   warning the potential collision object to avoid the vehicle, wherein the warning measures include acoustic outputs or optical outputs or both to the potential collision object from the vehicle;
   sending a request to a third party for moving the potential collision object; and
   sending a request to the external computing device for requesting a new parking navigation path.

7. The in-vehicle device according to claim 1, wherein the object features include:
   object types or object sizes or both, the object types including a movable type and an immovable type;
   an absolute position of the potential collision object and/or a relative distance between the potential collision object and the vehicle; and
   a relative position of the potential collision object relative to the current travelling lane.

8. The in-vehicle device according to claim 7, wherein the object features further includes a motion trajectory of a movable object; and
   the parking controller is further configured to predict a motion trend of the movable object based on the motion trajectory and determine the danger level based on the motion trend.

9. The in-vehicle device according to claim 8, wherein the parking controller is configured to predict the motion trend using a machine learning model, the motion trajectory of the movable object during a preceding time period is input into the model, and the model outputs a predicted trajectory of the movable object during a succeeding time period as the motion trend; or
   wherein the parking controller is configured to determine the motion trend of the movable object based on an extension line of the motion trajectory and a moving speed of the movable object.

10. The in-vehicle device according to claim 1, wherein the parking navigation path is calculated by the external computing device based on the following information and wirelessly transmitted to the communication interface:
(1) map data of a parking area;
(2) status information of parking spaces in the parking area;
(3) the current position of the vehicle; and
(4) traffic regulations.

11. The in-vehicle device according to claim 1, wherein the external computing device comprises a cloud server or a computing device arranged in a parking area or both; and
the external sensing device comprises roadside sensors arranged in a parking area for sensing traffic conditions of the parking area.

12. The in-vehicle device according to claim 1, wherein the parking controller is arranged in an electronic control unit (ECU) of the vehicle, or is arranged to be independent of and communicatively connected with the electronic control unit.

13. An automatic parking assistance system, comprising:
a remote server wirelessly communicated to a vehicle, the remote server being configured to calculate a parking navigation path based on previously stored information, the information including: (1) map data of a parking area; (2) status information of parking spaces in the parking area; (3) the vehicle's current position; and (4) traffic regulations, the parking navigation path being a path between a parking position and a drop-off position;
a roadside facility wirelessly communicated with the vehicle and the remote server, the roadside facility including roadside sensors for sensing traffic information representing traffic conditions around the vehicle; and
an in-vehicle device wirelessly communicated with the remote server and the roadside facility and communicatively connected with in-vehicle sensors, the in-vehicle device comprising:
a communication interface wirelessly communicated with the remote server and the roadside facility, the communication interface being configured to receive the parking navigation path from the remote server and receive the traffic information from the roadside facility or in-vehicle sensors of the vehicle or both; and
a parking controller coupled with the communication interface, the parking controller being configured to:
acquire the traffic information and the parking navigation path;
control vehicle parking maneuvers based on the parking navigation path;
determine whether there is a potential collision object based on the traffic information; and
perform the following operation based on said determination:
when it is determined that there is no potential collision object, controlling the vehicle to travel along the parking navigation path; when it is determined that there is a potential collision object, determining a danger level of the potential collision object based on the traffic information and determine safety measures corresponding to the danger level, the danger level indicating a probability of collision between the vehicle and the potential collision object,
wherein determining the danger level of the potential collision object comprises:
extracting object features of the potential collision object from the traffic information; and
determining the danger level corresponding to the object features by searching the danger level corresponding to the object features in a correlation table including a correlation between each object feature and a corresponding danger level;
wherein, before receiving the parking navigation path, the in-vehicle device receives an alert through the communication interface, when the vehicle is in a violation state, the violation state including at least one of at least one vehicle door being open, the vehicle crossing a lane, and the direction of the front of the vehicle not matching the direction of the parking navigation path; and
wherein the parking controller is configured to adjust the vehicle to a compliance state in response to receiving the alert, the compliance state including all of the vehicle door being closed, the vehicle speed being zero, the vehicle not crossing a lane, and the direction of the front of the vehicle matching the direction of the parking path.

14. An automatic parking assistance method, comprising:
receiving a parking navigation path and traffic information, the parking navigation path being a path between a parking position and a drop-off position, the traffic information representing traffic conditions around a vehicle;
controlling vehicle parking maneuvers based on the parking navigation path;
determining whether there is a potential collision object based on the traffic information; and
performing the following operation based on said determination: when it is determined there is no potential collision object, controlling the vehicle to travel along the parking navigation path:
when it is determined there is a potential collision object, determining a danger level of the potential collision object based on the traffic information and determining safety measures corresponding to the danger level, the danger level indicating a probability of collision between the vehicle and the potential collision object,
wherein determining the danger level of the potential collision object comprises:
extracting object features of the potential collision object from the traffic information; and
determining the danger level corresponding to the object features by searching the danger level corresponding to the object features in a correlation table including a correlation between each object feature and a corresponding danger level;
wherein, before receiving the parking navigation path, a in-vehicle device receives an alert through a communication interface, when the vehicle is in a violation state, the violation state including at least one of at least one vehicle door being open, the vehicle crossing a lane, and the direction of the front of the vehicle not matching the direction of the parking navigation path; and
wherein a parking controller is configured to adjust the vehicle to a compliance state in response to receiving the alert, the compliance state including all of the vehicle door being closed, the vehicle speed being zero, the vehicle not crossing a lane, and the direction of the front of the vehicle matching the direction of the parking path.

* * * * *